US00RE42565E

(19) United States
(12) Reissued Patent
Paepcke

(10) Patent Number: US RE42,565 E
(45) Date of Reissued Patent: Jul. 26, 2011

(54) MIDIWAN: A SYSTEM TO ENABLE GEOGRAPHICALLY REMOTE MUSICIANS TO COLLABORATE

(75) Inventor: Andreas Paepcke, Menlo Park, CA (US)

(73) Assignee: Codais Data Limited Liability Company, Dover, DE (US)

(21) Appl. No.: 12/592,273

(22) Filed: Nov. 20, 2009

Related U.S. Patent Documents

Reissue of:
(64) Patent No.: 7,297,858
Issued: Nov. 20, 2007
Appl. No.: 11/000,326
Filed: Nov. 30, 2004

(51) Int. Cl.
*G10H 7/00* (2006.01)
*G04B 13/00* (2006.01)

(52) U.S. Cl. ..... 84/609; 84/645; 84/649

(58) Field of Classification Search ..... None
See application file for complete search history.

(56) References Cited

U.S. PATENT DOCUMENTS

| | | | | |
|---|---|---|---|---|
| 5,734,119 | A * | 3/1998 | France et al. | 84/622 |
| 6,067,566 | A * | 5/2000 | Moline | 709/219 |
| 6,069,310 | A * | 5/2000 | James | 84/645 |
| 6,143,973 | A * | 11/2000 | Kikuchi | 84/645 |
| 6,653,545 | B2 * | 11/2003 | Redmann et al. | 84/615 |
| 6,815,601 | B2 * | 11/2004 | Yano | 84/655 |
| 6,898,729 | B2 * | 5/2005 | Virolainen et al. | 714/4 |
| 7,050,462 | B2 * | 5/2006 | Tsunoda et al. | 370/474 |
| 7,129,408 | B2 * | 10/2006 | Uehara | 84/645 |
| 7,288,712 | B2 | 10/2007 | Uehara | |
| 7,405,355 | B2 * | 7/2008 | Both et al. | 84/645 |
| 2005/0150362 | A1 * | 7/2005 | Uehara | 84/645 |
| 2006/0123976 | A1 * | 6/2006 | Both et al. | 84/600 |

OTHER PUBLICATIONS

Angela Pacienza, "New software aids piano teachers", Canoe CNEWS, dated Feb. 26, 2004 (obtained online on Dec. 3, 2006).
(Author unknown), "'Internet Direct Connection' Downloads Music Directly to Yamaha Keyboards", Yamaha Corporation, dated Jul. 24, 2004 (obrtained online on Dec. 3, 2006 from http://namm.harmony-central.com/SNAMM04/Content/Yamaha/PR/Internet-Direct-Connection.html).
(Author Unknown), "'Player pianos' for the digital age", Yamaha Corporation, with designation "© 2002" (obtained online on Dec. 3, 2006 from http://www.yamaha.co.jp/english/product/piano/product/europe/dl/dl.html).
Angela Frucci, "Mastering music through online instruction informal learning is leveling out the creative experience", San Francisco Chronicle (referencing the New York Times), Oct. 15, 2006.

* cited by examiner

*Primary Examiner* — Marlon T Fletcher

(57) ABSTRACT

A system is described to allow musicians to collaborate over a network such as the Internet.

56 Claims, 4 Drawing Sheets

*MIDIWan Functional Overview*

*Communication Machinery*

*MIDIWan Functional Overview*

*Communication Machinery*

*Routing Architecture*

MIDIWAN: A SYSTEM TO ENABLE GEOGRAPHICALLY REMOTE MUSICIANS TO COLLABORATE

Matter enclosed in heavy brackets [ ] appears in the original patent but forms no part of this reissue specification; matter printed in italics indicates the additions made by reissue.

BACKGROUND

Musicians often desire to collaborate across the Internet. For example:

Scenario 1: A musical composition teacher and her students live far enough apart that lessons cannot be conducted face to face. The teacher, for example, might reside in a rural area, while the student needs to live in a metropolitan environment that offers employment opportunity. Alternatively, student or teacher may be disabled and thus incapable of travel.

Scenario 2: A number of musicians wish to collaborate in the creation of a composition. The work continues over an extended period of time, and the artists cannot collocate frequently enough to be effective. They each need to play stretches of music for each other and communicate verbally about the evolving art.

There are a few devices presently available that will allow for musical collaboration over the Internet. We consider these in turn.

1. Video Conferencing. A number of video conferencing solutions exist for supporting meetings of geographically distributed participants. Assume for the moment the simple case that two sets of participants are attempting to meet. The two groups are each located in a specially equipped room.

In one approach, a video conferencing system simply records the sounds in each room and transmits the recorded sounds to a remote location. Once there, the sound is played back through loudspeakers to the remote participants. Similarly, cameras capture the scene in each room. The video signal is also transmitted and replayed at the remote site. Video cameras or other image capture devices, for example, Web Cams, can be deployed for the visual component of video conferencing. These are small, inexpensive cameras that transmit video signals across the Internet.

A common disadvantage of typical video conferencing approaches is that, once stored in digital form on a computer, the audio of musical performance snippets is difficult to manage. Typically, collaborative music sessions consist of numerous re-renderings of music fragments. When composition is the goal, musicians often generate a number of improvised alternatives. Often recording is very difficult to organize without expensive management software.

An exacerbating fact in the context of snippet organization is that the transcription of audio recordings into musical notation can also be very difficult. This task may require an expert and considerable time investment.

Finally, sounds transmitted using this system are normally limited by the quality of the instrument that generates them. A receiving musician therefore does not benefit from his own equipment's (potentially) superior capabilities. If the remote instrument is mediocre, the receiver must work with the resulting sound.

2. Custom Instruments. Custom instruments such as Yamaha's Music Path approach the problem by custom modifying acoustic grand pianos. Special sensors measure how hard piano keys are pressed during a performance. The resulting data, and video images, are transmitted to the remote piano through a high-speed connection.

The remote piano's keys and pedals are attached to mechanical actuators that physically reproduce the motions of the originating instrument. The keys and pedals at the receiving piano move "by themselves."

This method has an advantage over the video conferencing technique: the receiving musician can hear the corresponding sounds as produced by his own instrument. Knowing his own piano well, the receiving musician can therefore judge with great refinement the effectiveness of the remote musician's key attack techniques. Similar techniques and technologies can be used for other musical instruments as well.

The custom instruments solution can be very expensive and, as with video conferencing, may be inadequate when it comes to easy snippet management.

3. Pure MIDI. Another approach is to use MIDI (Musical Instrument Digital Interface), the well-established standard for digital communication among musical instruments. MIDI defines how two or more instruments can communicate through a wire about which notes are to be played at the receiving instrument. The standard includes instructions on how to communicate the force with which, for example, piano keys are struck.

Inexpensive computer programs exist for turning MIDI into musical notation. Once available on the computer in notation, simple cut/paste manipulations can be used to arrange snippets. The snippet management problem is thereby much alleviated. Anyone who understands music can easily interact with notation. This stands in contrast to stored audio, which requires the skills of audio engineers to manipulate.

MIDI devices cover a wide range of acquisition costs. Very inexpensive units are available. The signals they produce can be of almost as high a quality as MIDI that is produced on more expensive devices. The difference between instruments instead enters into the reproduction of sound from the MIDI data stream. The MIDI stream recipient might own a MIDI-capable instrument that can produce excellent sound, while the sender operates on a much more modest keyboard.

Unfortunately, MIDI is confined to very fast communication networks, such as those comprising point-to-point wires between instruments. These wires must not exceed 50 feet.

4. Other possible approaches. It is possible to translate MIDI signals into digital form and to transport them to other instruments over a local area network (LAN). This approach may allow musicians that are situated close together within, for example, a small building, to collaborate. However, as soon as the distance between the participants grows, network delays render this solution unusable.

SUMMARY OF THE INVENTION

The device described herein, referred to as "MIDIWan", can enable musicians to collaborate remotely, e.g., across the Internet. In operation, each musician deploys a small device at his site. The device couples to the musician's instrument and can connect to a network such as the Internet. In one approach MIDIWan transmits multiple forms of data, including (but not limited to) music encoded with MIDI signals, voice, and video between the participants. Additionally, transmitted music is stored at the recipient's site. Further, in one approach, the data is compatible with different instruments and may allow participants of a session to own instruments of widely differing quality.

In commercial products, it may be desirable to provide these attributes in an easy-to-use and inexpensive package. Various configuration possibilities are disclosed to achieve these goals. However, in some applications the approaches, devices, systems, and methods described herein may be implemented in more complex, sophisticated, versatile, costly or other approaches, including those with multiple configuration possibilities.

DETAILED DESCRIPTION OF THE INVENTION

MIDIWan can use the Internet or similar network as a transport medium for MIDI signals. The MIDI standard assumes a near-zero transmission delay between communicating instruments. It depends on each signal arriving at the destination instrument as soon as the originating instrument generates the signal. The timing fidelity of the remote music reproduction can depend significantly on this assumption being true.

This assumption may be problematic when the Internet or other complex networks are used as the transmitting medium. Often, the Internet will introduce unpredictably long delays on data that may cause unacceptable delays between successive notes. Unless these delays are somehow compensated for, this shortcoming can produce unacceptable 'stutters' during the reproduction.

Figure 1:
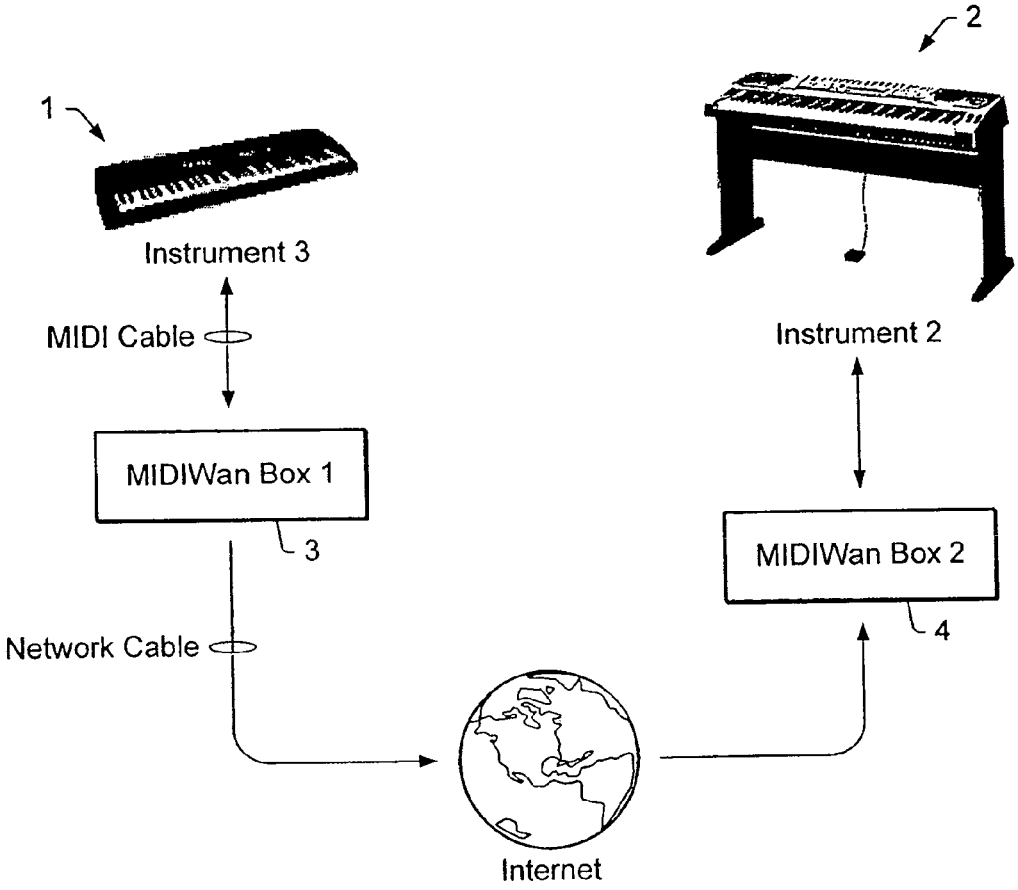
FIG. 1 shows a Functional Overview of the MIDIWan system.

The exemplary MIDIWan system described herein provides hardware and software between two (or more) communicating instruments that can compensate for such system characteristics and may thereby smooth or remove the stutters. FIG. 1 shows a simple exemplary system.

Overview of Architecture

In FIG. 1, Instrument 1 communicates with instrument 2 across the Internet, using a MIDIWan box (3 and 4) on either side of the Internet connection. As shown in FIG. 1, wires connect the MIDIwan box and the local instrument.

In this embodiment, the wires are standard, easily obtained MIDI cables. Standard local area network connection cables couple the MIDIWan box to the Internet. The instruments may be of widely varying quality, as long as they generate MIDI signals as part of their operation. Note that MIDI information is allowed to flow both ways across the Internet connection at the same time.

When MIDI signals are transmitted over the Internet, unpredictable delays are introduced. MIDIWan compensates for these delays by buffering the signals within the MIDIWan box in a signal memory. In this particular embodiment, the signal memory is located in the communication module of the MIDIWan device.

Figure 2:
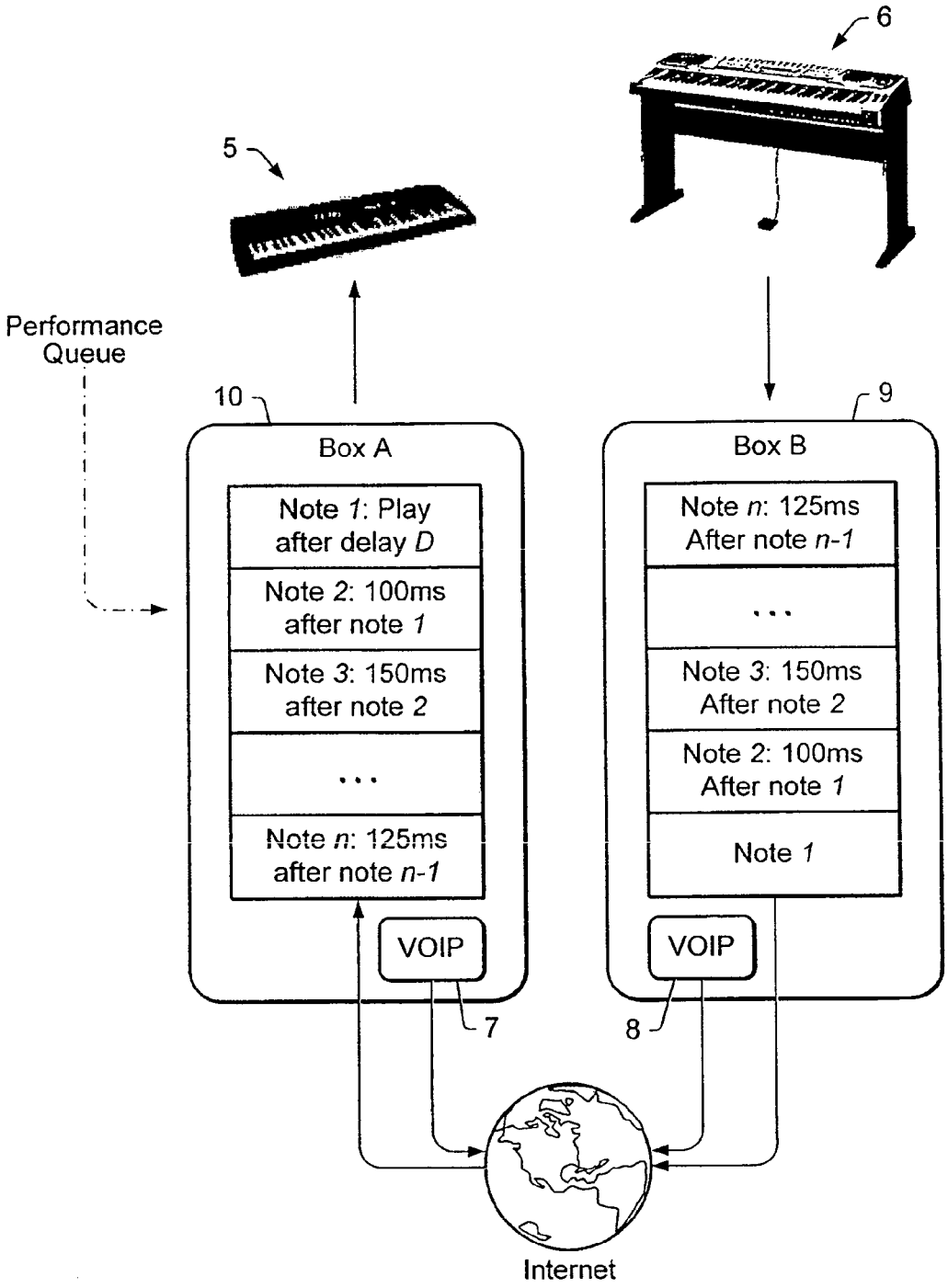
FIG. 2 shows a block level diagram of the operation of MIDIWan between two remote sites.

FIG. 2 shows a simplified interior view of the communication module in a pair of MIDIWan boxes. In the Figure, Instrument 5 is assumed to be receiving music from Instrument 6. Again, these same processes may operate in both directions at the same time.

Note that in one approach, the MIDIWan system includes at least two independent communication paths. One is the previously described bidirectional transmission of MIDI messages (i.e. musical notes). The other is a two-way voice channel. In FIG. 2, the voice channel is represented by boxes 7 and 8 labeled 'VOIP,' which stands for 'Voice over Internet Protocol.' Standard techniques are used for this channel. As mentioned above, the problem with sending MIDI signals across the Internet are the unpredictable delays that the Internet introduces into the signal stream. We next describe how MIDIWan compensates for these unavoidable delays.

Delay Compensation

Referring to FIG. 2, before sending MIDI note N from instrument 6 across the network, Box B (9) prepends a relative time stamp to that note. For simplicity of presentation, in the exemplary system the time stamp of the first note will be zero. Assume that the human player operates a second piano key 100 ms after the first note. In this case, the resulting note $N_{i+1}$ will be assigned time stamp 100. Once again the numbering provision here is simplified to one count per millisecond for ease of understanding.

At the receiving end Box A (10) does not play $N_i$ immediately. Instead, the box waits for a time period D to elapse before playing the note. This time lapse is selected to be large enough that with some likelihood, several notes will have arrived before $N_i$ is passed out of Box A to be sounded on Instrument 5.

This buffering of notes makes up for time delays that the Internet introduces between the various notes. Some notes might arrive quickly, others with more of a time lapse. But because the notes are queued up at the receiver, these delays are smoothed out.

The use of relative time stamps has a great advantage over time stamps that are snapshots of real time. Using absolute time stamps would introduce the need for synchronization of communicating MIDIWan boxes. While possible, such synchronization would significantly increase MIDIWan's complexity. Instead, the MIDIWan system only needs to manage a time window of a few notes that each carry their timing information with them.

The buffering time delay that MIDIWan intentionally introduces is irrelevant to the musical integrity of the piece being played, as the performing player is typically not aware of the delay. His sounds are produced immediately by his own Instrument 5.

The voice channel could act as a potential return carrier of the delayed music. To avoid this feedback, the receiving voice channel sound reproduction is deactivated or otherwise limited at Player 2's site while Player 2 is playing, and a "squelch" is provided to allow Player 1 to 'break through' to Player 2 if she wants to interrupt Player 2's performance. A squelch is a standard method for suppressing audio below a threshold level of intensity. When audio above this threshold is received the audio will begin to be heard.

In some applications it may be desirable to minimize the delays introduced as much as possible or to trade off delay time versus probability of stutters or other artifacts. In one approach, the tradeoffs can be established using delay parameter tuning. In one implementation, delay parameter tuning follows a two-step process: worst-case analysis and dynamic adaptation.

Worst-Case Delay Need Analysis

The most aggressive (long) delays are typically introduced in the signal paths of highly proficient players when they perform very fast pieces of music. The inter-note pauses in such a performance are small, so many of these fast notes are queued up at the receiving site in order to compensate for the intermittent Internet delays. The note reproduction delay will therefore be high, compared to the inter-note spacing.

A second reason for aggressive delay adjustment is a slow or unreliable Internet connection. An unreliable connection will usually still deliver all notes, but this delivery will entail a number of retransmissions, each after some time has elapsed. Unreliability thus translates to long delays and irregular playback speed.

Whenever a connection is established between two boxes, both of the above conditions can be considered when determining a suitable delay. The following procedure is employed: as soon as two boxes connect, they each automatically send musical scales to the other. They adjust the inter-note times such that the scales mimic the warm-up scale playing of a very skilled human player. Again, the scales are transmitted in both directions at the same time.

While the scale notes arrive at each end, the receiving box progressively decreases the delay until it begins missing notes. This process establishes the lowest allowable delay. Once this value is determined, the receiving box signals the sender that further transmission of scales is not required.

The initial delay as determined via the scale exchanges reflects the state of the Internet connection. It is a very conservative delay, however, since many players do not perform at the level of an expert. This is particularly true for the student/teacher scenario. Each box therefore monitors the rate of incoming notes. If the rate is low, the delay is shortened. For a slow player the inter-note pauses serve as Internet delay buffers themselves.

While an appropriate delay can be determined using the above two techniques, other techniques may be employed. For example, one or both of the boxes can generate one or more pulses or "pings" to give an estimate of transmission delays. Based upon the estimate and a variety of other data and/or algorithms, the system can establish the appropriate delay.

Simplicity of the User Interface

It is further desirable that MIDIWan be simple to use and not evoke the notion that it is a computer. Though it is not necessary to the ultimate operation of the MIDIWan system, achieving this may increase the acceptance of the device by a broad spectrum of musicians. In the preferred embodiment this is achieved through both hardware simplicity and software simplicity, though either can be used standing alone.

Hardware Simplicity

In one approach, MIDIWan can be deployed without a standard computer keyboard or separate monitor. In one relatively simple embodiment, a small LCD display, two lines of 16 characters each, forms the visual connection to the human user. In one typical embodiment, the MIDIWan can be deployed by using three sockets (though for some applications more, or even fewer may be acceptable), a power adapter, and an on/off switch. One of the three sockets accepts a MIDI cable that feeds notes from the local instrument to the box, another is for the cable that passes the incoming MIDI signal to the instrument. The third socket, finally, accepts the Internet connection.

A Web server may allow more extensive interaction with the box. Any browser can be used to enter into a maintenance session with the box. In the preferred embodiment, Microsoft's Internet Explorer is used. However, in many cases the invocation of this facility is not needed at all. For example, in many cases the box can automatically obtain its Internet (IP) address via a standard DHCP service. The preferred embodiment, for example, is capable of interacting with such a service. Similarly, the addresses of potential remote MIDIWan partner boxes can be retrieved automatically from a name service. Additionally, every MIDIWan box retains the communication details of other boxes that it was connected to in the past.

Software Simplicity

In the preferred embodiment, the only interaction with a MIDIWan box, other than plugging in the cables, is the selection of the remote musician(s) that the local musician wishes to interact with. This can be accomplished without a computer keyboard by utilizing the musical instrument that is attached to each MIDIWan box. Each box contains a directory of possible remote partners to interact with. Each entry holds an easy-to-remember name, such as the name of a remote musician. The entry also contains all information that is necessary to establish an Internet connection.

When a MIDIWan box is first turned on, the top line of the LCD display shows the name in one of the directory entries. The musician then scrolls the directory up by hitting a piano key above Middle-C. Scrolling down is prompted by keys below Middle-C, while hitting the C-key itself signals to the box the user's final choice of connection partner. Other solutions can be used as well.

Addition of Directory Entries. In the preferred embodiment, MIDIWan offers two methods for inserting a new directory entry. The first is through the Web interface mentioned earlier. A Web browser can connect to a MIDIWan box, and entries can be submitted by filling out a form.

This Web-based method is, however, not the most desirable, because it is counter to the goal of user interface simplicity. Another possibility is described in FIG. 3, which shows just three nodes involved in a MIDIWan interaction. The two MIDIWan peers, Box A and Box B, and a MIDIWan server 15 reside somewhere on the Internet. The server 15 serves two functions. It is a match maker for MIDIWan boxes, and it can serve as a go-between among boxes. The match making function is the focus in this current discussion.

In the preferred embodiment, when a MIDIWan box is turned on, it announces its presence to the MIDIWan server 15. From this 'I am alive' message the server gleans not just the name of the newly joining box, but also its Internet contact data. The server remembers this information. Whenever another MIDIWan box at a later time wishes to contact the newly joined box, the server can furnish the contact address. This mechanism allows the user of a MIDIWan box to be aware just of the names of the other boxes, rather than having to contend with Internet addresses. Because of the automatic check-in when each box is turned on, it is not a problem if MIDIWan boxes are moved to other locations and different Internet access locations. The server will be brought up to date as soon as the roaming box is turned on while connected to the Internet.

For security reasons, though, many access points to the Internet are protected by firewalls. These devices partition the Internet into multiple 'islands'. A firewall creates such an island by controlling network traffic between the open Internet and the set of computers that are attached to the inside of the firewall.

Firewalls will not normally impede a box's check-in to the server, or the contact address acquisition that we described above. Firewalls do not interfere with Internet connection attempts that originate from any of the firewall's local computers. However, firewalls may prevent MIDIWan boxes from communicating with each other.

Figure 3:
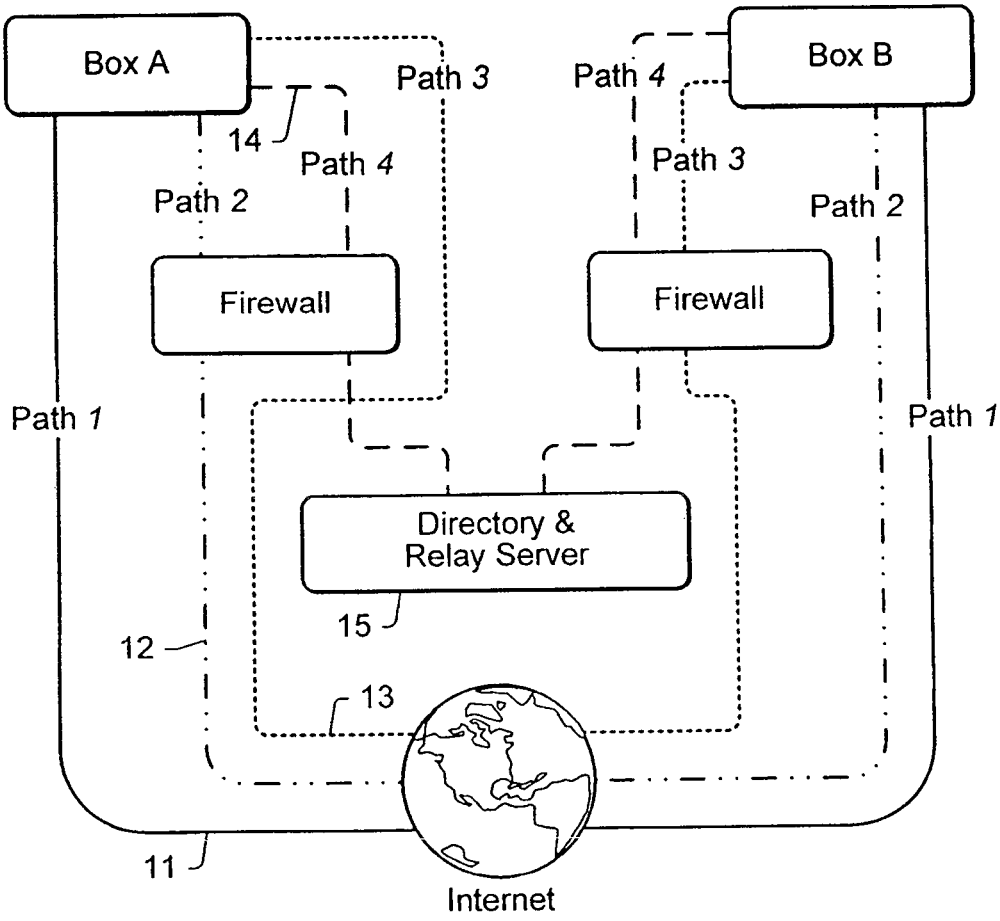
FIG. 3 shows a routing architecture that can be used to connect two MIDIWan devices.

FIG. 3 shows four communication configurations that MIDIWan boxes need to contend with. Any two MIDIWan boxes may find themselves bound into one of the four configurations.

Path 1 (11) is the simplest case. Neither MIDIWan box is behind a firewall. Once they know each others' address through the interaction with the directory server they can communicate directly with each other through the open Internet. In this case the directory server is often not needed at all after two boxes have connected at least once. Each MIDIWan box retains the connection information of the boxes it has communicated with before. In the Path 1 case both boxes will retain their Internet addresses across sessions.

Path 2 (12) shows the case where Box A is protected by a firewall, but Box B is not. This configuration is navigated by ensuring that Box A initiates communication with Box B, rather than the other way around. The latter would fail, because Box A's firewall would block the incoming connection attempt.

Path 3 (13) is the opposite case, where Box B is firewalled, while Box A is open. MIDIWan boxes cannot know which configuration they must navigate. In order to contend with both Path 2 and Path 3 MIDIWan boxes 'reach out to each other.' That is, once each box knows the contact information of its peer-to-be, each of the boxes tries to contact the other. In case of Path 2, Box A will succeed, in case of Path 3 Box B will successfully complete the connection process. Only one needs to succeed; as soon as such a success is registered, the futile contact attempts cease and the two boxes can begin work.

A more complex case is Path 4 (14). Neither box can be contacted from the outside. Each only allows outgoing connections through their respective firewall. In this case MIDIWan falls back on the relay server 15, which may or may not be the same computer as the one serving the directory. Each MIDIWan box separately constructs a connection to the relay. The relay then passes all traffic from one connection to the other. This configuration is, of course, the least desirable, because it introduces delays and requires the server to be up and running throughout the MIDIWan session.

Configuration on an Unknown Subnet. Sometimes, when a MIDIWan device is attached to the Internet, it will be necessary to interact with the device through its built-in Web server. This is the case when the network location to which the device is connected does not provide automatic IP address assignment services (DHCP). In that case the user of the MIDIWan device must manually configure the device. This configuration is accomplished by accessing the MIDIWan device through its Web interface.

Unfortunately, the user cannot know at which Internet contact address (IP address and port) the device is listening. It is therefore not possible for the user to provide his Web browser with a proper working URL. Without that URL the user cannot configure the MIDIWan device; the problem is circular. If the device were configured, it would be reachable from a browser. But in order to go through the configuration process, the device needs first to be configured.

MIDIWan solves this problem by generating a temporary Internet address, which it communicates to the user on a display. In case of the preferred embodiment this is the small LCD display. The problem is, however, that one cannot simply invent an IP address and expect the device to be reachable from a Web browser. The address must be appropriate for the portion, or subnet, that the MIDIWan device is attached to.

The MIDIWan device must therefore find an IP 'template' from which it can construct a temporary address at which it can listen for the configuration request. The template consists of, usually, the first two or three numbers of an IP address. For example, the template of the address 205.23.5.57 might be 205.23 or 205.23.5. This notion extends to the newer IPv6 addressing scheme.

MIDIWan employs three Internet standards in combination to find a proper IP template if at all possible. The following standards are used:

1. ICMP
2. RIP
3. ARP

The ICMP and RIP protocols are intended for Internet clients to find nearby Internet routers. A router is a traffic directing device that connects subnets to other subnets and to the larger Internet. Normally, Internet applications do not need to know the address of their subnet's router. The importance of knowing a router address in the present context is that such an address is guaranteed to be a proper address for the subnet to which the MIDIWan device is attached. The router address is therefore a good source for an IP template. The MIDIWan device thus needs to coax the nearest router into sending a packet that the device can receive and use to extract the template.

A MIDIWan device that finds itself unconfigured on an unknown subnet without DHCP service will send out both ICMP and RIP packets in the hope that a router will respond with a broadcast reply. If a response is received, the template is extracted and a random number generator is used to create an IP address.

The device cannot, however, simply use this address, because another Internet device might already be using that IP address. The Internet does not allow multiple devices to use the same address. After the IP generation the MIDIWan device therefore uses a third Internet standard, ARP, to ensure that no other device is currently operating with the randomly generated address. If another device is found, the random number generator creates another IP address candidate.

When a valid address is finally found, it is shown on the device's display. The user can then generate the configuration request from a browser and provide the MIDIWan device with a more permanent address.

Possible Extensions to MIDIWan

A potential extension of the basic MIDIWan system integrates some features of advanced audio editors into each MIDIWan box. For example, each box may identify stretches of music that are likely to be coherent units, such as repeated attempts to play a particular few measures of a composition. Pauses in a performance that are longer than common rests could be interpreted as boundaries of such stretches. Alternatively, the use of the voice channel might be taken as a signal that a coherent stretch of music rendition is finished. A related application of this capability arises from scenario 2. Successive attempts at playing a solo could each be retained as a unit. At the end of a session a MIDIWan companion music editor on an attached desktop computer could then organize all the snippets into tracks and recording 'takes.'

TECHNICAL CONCLUSION

Figure 4:
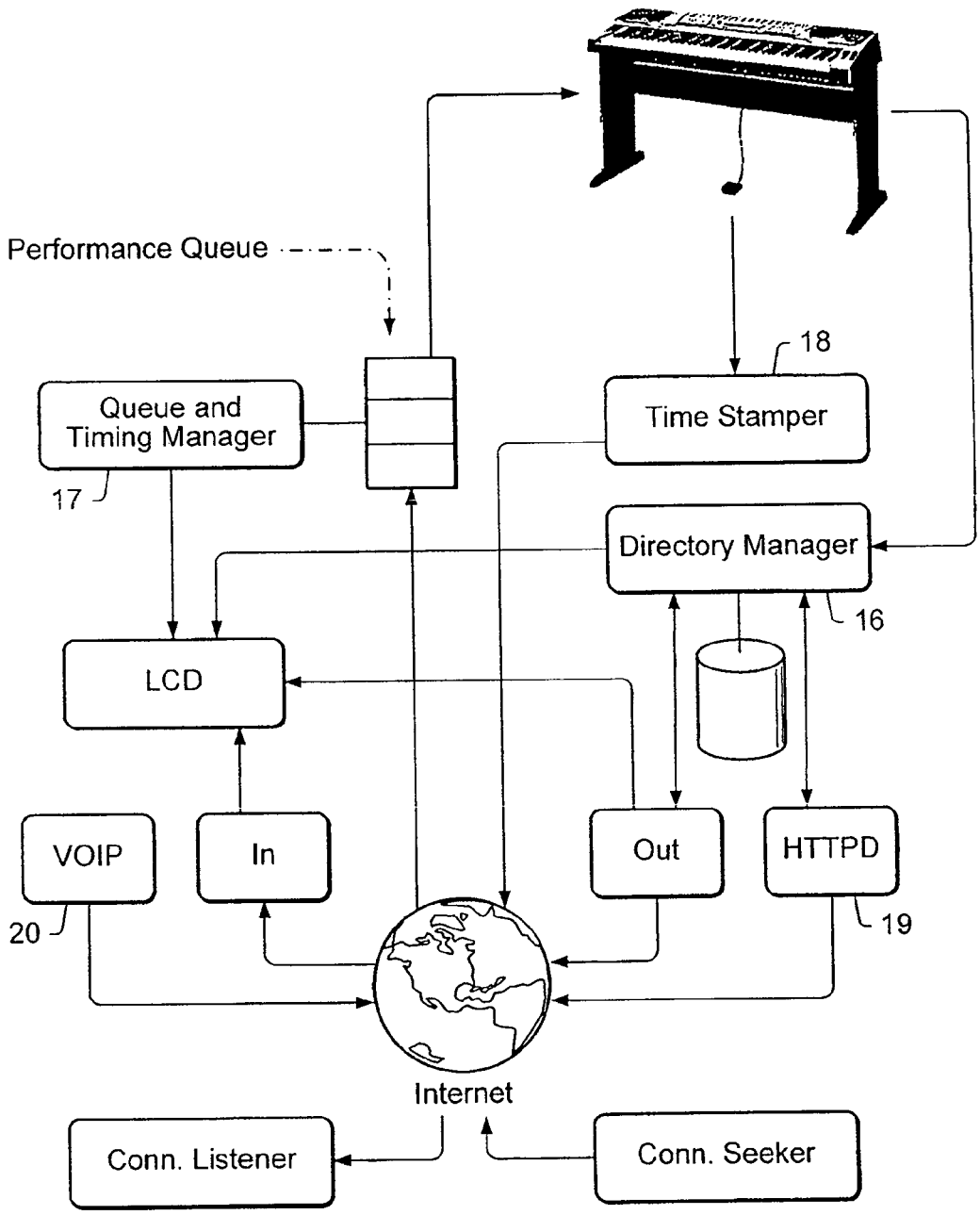
FIG. 4 shows some detail, in block diagram form of the software architecture.

FIG. 4 summarizes how the modules we have described interact and shows the software architecture of an individual MIDIWan box. Once the instrument was used to operate the directory module, the connection seeker begins repeated connection attempts to the prospective peer, if the peer's contact information is available in the directory module 16.

At the same time, the IT connection listener begins to listen for other MIDIWan boxes that might wish to establish a connection. Both, the connection seeker and listener modules employ the LCD screen to continuously inform the user about their status. Once a connection is established, the connection seeker and connection listener cease operations. They stand by in case the connection breaks down for any reason. In that case they immediately resume their work.

Incoming MIDI information is passed into the performance queue, which is managed by the queue and timing manager 17. It is responsible for delivering notes from the queue to the local instrument at precisely the correct time.

Outbound, the local instrument's signal is passed into the time stamper 18, which packages the MIDI messages into Internet packets after prepending the relative time at which the outgoing note needs to be sounded at the remote end.

The HTTP module 19 is available at all times. The voice over IP module 20 also operates in parallel to the other modules.

RANGE OF EMBODIMENTS

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of someone skilled in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality.

While particular aspects of the present subject matter described herein have been shown and described, it will be obvious to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should NOT be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" and/or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of one having skill in the art would understand the convention (e.g., "a system having at least one of A, B, and C" would include but not be limited to systems that have A alone, B alone, C alone, A and B together, A and C together, B and C together, and/or A, B, and C together). In those instances where a convention analogous to "at least one of A, B, or C, etc." is used, in general such a construction is intended in the sense of one having skill in the art would understand the convention (e.g., "a system having at least one of A, B, or C" would include but not be limited to systems that have A alone, B alone, C alone, A and B together, A and C together, B and C together, and/or A, B, and C together).

Although the present invention has been described in terms of the presently preferred embodiment, it is to be understood that the disclosure is not to be interpreted as limiting. Various alterations and modifications will no doubt become apparent to one skilled in the art after reading the above disclosure. Accordingly, it is intended that the appended claims be interpreted as covering all alterations and modifications as fall within the true spirit and scope of the invention.

The invention claimed is:

1. A system for outputting sounds at a local location corresponding to music played at a remote location in substantially real time, comprising:

a. An instrument or instrument simulator;

b. A network interface operative to receive data corresponding to the music played at the remote location, the data being received with a variable delay relative to the music played, the network interface further being operative to play back music received from the remote location with dynamically adjustable delays at the local location, the dynamically adjustable delays correlating to relative time stamps of the data corresponding to the remotely played music, the network interface further operative to send data corresponding to music played locally to the remote location with relative time stamps corresponding to the locally played music; and c. A signal interface device having a first port coupled to receive data from the network interface and to transmit data to the network interface, and a second port coupled to the instrument or instrument simulator, the signal interface device including:

i. A memory cache operable to store data received by the network interface; and ii. A data assembly and transmission unit, operable to retrieve the stored data and provide a substantially continuous stream of data to the instrument or instrument simulator, and further operable to transmit data generated by the instrument or instrument simulator.

2. The system of claim 1 wherein the network interface unit is Internet compatible.

3. The system of claim 1 wherein the substantially continuous stream of data is MIDI data.

4. The system of claim 3 further including a secondary network interface unit.

5. The system of claim 4 wherein the secondary network interface unit includes an audio converter, responsive to VoIP data to produce an audio signal.

6. The system of claim 5 further including an output speaker responsive to the audio signal to produce audible sounds.

7. The system of claim 1 wherein the instrument or instrument simulator includes a piano.

8. The system of claim 1 further including a delay management unit coupled to signal interface device or the network interface unit.

9. The system of claim 1 wherein the delay management unit is responsive to the received data to establish a memory cache allotment.

10. The system of claim 9 wherein the memory cache allotment corresponds to a determined average transmission delay.

11. The system of claim 1, wherein the dynamically adaptable variable delay time is configured to compensate for network transmission delays by the use of relative time stamps corresponding to the output sounds.

12. The system of claim 1, wherein the dynamically adaptable variable delay time is configured to compensate for the network transmission delays by the use of output delays for sounds that are selected to reduce stutter of output sounds.

13. The system of claim 1, wherein the dynamically adaptable variable delay time is configured to compensate for the network transmission delays by the use of output delays for sounds that are long relative to pauses between the sounds when played.

14. The system of claim 1, wherein the dynamically adaptable variable delay time is configured to compensate for the network transmission delays by monitoring a rate of incoming data and adjusting the delay based upon the monitored rate.

15. The system of claim 14, wherein the dynamically adaptable variable delay time is configured to compensate for the network transmission delays by shortening the delay if the monitored rate is low.

16. The system of claim 1, wherein the dynamically adaptable variable delay time is based upon transmission delays detected in the received data and upon delays of signals generated by the instrument or instrument simulator that are transmitted to the remote location.

17. A method of representing music at a local location where the music has been played at a remote location, comprising:

a. Coupling to a network;

b. Receiving data from the network;

c. Caching a portion of the received data;

d. Outputting stored data in a substantially continuous manner with a local variable delay time at the local location that is dynamically adaptable to compensate for network transmission delays, the variable delay time being based at least in part upon relative time stamps of the received data representing times of generation of data relative to at least one preceding data item; and e. Producing audible sounds responsive to the outputted data;

the method further comprising generating local data relating to music played at the local location, and correlating relative time stamps with the local data for transmission to the remote location and playback at the remote location with a remote variable time delay based at least in part upon the relative time stamp of the transmitted data.

18. The method of claim 17 wherein producing audible sounds responsive to the outputted data includes:

a. Accepting the outputted data with a musical instrument; and b. producing the audible sounds with the musical instrument.

19. The method of claim 17 further including:

a. Determining a nominal transmission delay of the data; and b. Establishing the portion of data responsive to the determined nominal transmission delay.

20. The method of claim 19 wherein determining a nominal transmission delay of the data includes:

a. receiving a series of related data having a known relationship;

b. Identifying deviations from the known relationship; and c. Determining the nominal transmission delay as a function of the identified deviations.

21. The method of claim 17 wherein the data is MIDI data.

22. The method of claim 17, wherein the dynamically adaptable variable delay time is selected to compensate for network transmission delays by the use of relative time stamps corresponding to the output sounds.

23. The method of claim 17, wherein the dynamically adaptable variable delay time is selected to compensate for the network transmission delays by the use of output delays for sounds that are selected to reduce stutter of output sounds.

24. The method of claim 17, wherein the dynamically adaptable variable delay time is selected to compensate for the network transmission delays by the use of output delays for sounds that are long relative to pauses between the sounds when played.

25. The method of claim 17, wherein the dynamically adaptable variable delay time is selected based upon transmission delays detected in the received data and upon delays of signals generated by the instrument or instrument simulator that are transmitted to the remote location.

26. A performance collaboration system, including:

a connection seeker circuit configured to establish a connection between a local circuit operably connectable to a local instrument and a remote circuit operably connectable to a remote instrument;

a time stamper circuit configured to correlate first relative time stamps with remote instrument data and to correlate second relative time stamps with local instrument data for transmission to the remote instrument;

a timing manager circuit configured to deliver data received from the remote circuit to the local instrument, the delivery being coordinated based at least in part upon the first relative time stamps; and delay circuitry configured to dynamically adapt a variable delay time for the timing manager circuit based upon network transmission delays between the remote circuit and the performance collaboration system, the delay circuitry configured to introduce the variable delay time to local playback of the received data.

27. The system of claim 26, wherein the timing manager circuit is configured to deliver MIDI data to the local instrument.

28. The system of claim 26, further including a circuit configured to transmit VOIP data from a remote location to a location of the local instrument.

29. The system of claim 26, wherein the delay circuitry is configured to select to variable delay time based upon delays in data transmission from the remote instrument to the local instrument.

30. The system of claim 26, wherein the delay circuitry is configured to select the variable delay time based upon delays in data transmissions both from the remote instrument to the local instrument and from the local instrument to the remote instrument.

31. The system of claim 30, wherein the data transmissions include MIDI data.

32. The system of claim 26, wherein the delay circuitry is configured to select the variable delay time based upon a worst-case delay, the worst-case delay being determined at least in part by determining a minimum delay necessary to avoid the local instrument missing reception of some data from the remote instrument.

33. The system of claim 26, further including retention circuitry configured to retain connection information between the remote instrument and the local instrument.

34. The system of claim 26, wherein the connection seeker circuit is configured to establish communication between the remote instrument and the local instrument over the Internet.

35. The system of claim 34, configured to retain an Internet address for the local instrument across communication sessions.

36. The system of claim 34, wherein the local instrument is behind a firewall.

37. The system of claim 34, further including an address circuit configured to generate a temporary Internet address for the local instrument.

38. The system of claim 37, wherein the address circuit is further configured to provide a valid Internet address in place of the temporary Internet address.

39. A performance collaboration system, including:

a time stamper circuit configured to correlate first relative time stamps with data from a remote instrument and to correlate second relative time stamps with data from a local instrument for transmission to the remote instrument;

a timing manager circuit configured to deliver data received from the remote circuit to the local instrument, the delivery being coordinated based at least in part upon the first relative time stamps; and delay circuitry configured to provide a delay time for the timing manager circuit based upon network transmission delays between the remote circuit and the performance collaboration system, wherein the delay time is selected based upon a lowest delay necessary to avoid the local instrument missing reception of notes transmitted from the remote instrument, the delay circuitry configured to introduce the variable delay time to local playback of the received data.

40. A computer program product including computer code that can be run on one or more processors to perform the steps of:

establishing a connection between a local circuit operably connectable to a local instrument and a remote circuit operably connectable to a remote instrument;

correlating first relative time stamps with data generated by the remote instrument;

delivering data received from the remote circuit to the local instrument, the delivery being coordinated based at least in part upon the time stamps;

dynamically adapting a variable delay time for the timing manager circuit based upon network transmission delays from the remote circuit, the variable delay time being introduced to local playback of the received data; and generating second relative time stamps for local data generated by the local instrument and transmitting the local data and the second relative time stamps for playback at the remote instrument.

41. The computer program product of claim 40, wherein the step of dynamically adapting a variable delay time includes selecting a delay time based upon delays in data transmission both from the remote instrument to the local instrument and from the local instrument to the remote instrument.

42. The computer program product of claim 40, wherein the step of dynamically adapting a variable delay time includes selecting a delay time based upon a worst-case delay, the worst-case delay being determined at least in part by determining a minimum delay necessary to avoid the local instrument missing reception of some data from the remote instrument.

43. A computer system configured to:

establish a connection between a local circuit operably connectable to a local instrument and a remote circuit operably connectable to a remote instrument;

correlate first relative time stamps with data generated by the remote instrument;

deliver data received from the remote circuit to the local instrument, the delivery being coordinated based at least in part upon the time stamps;

dynamically adapt a variable delay time for the timing manager circuit based upon network transmission delays from the remote circuit, the variable delay time being introduced to local playback of the received data; and generate second relative time stamps for local data generated by the local instrument and transmit the local data and the second relative time stamps for playback at the remote instrument.

44. The computer system of claim 43, further configured to dynamically adapt the variable delay time by selecting a delay time based upon delays in data transmission both from the remote instrument to the local instrument and from the local instrument to the remote instrument.

45. The computer system of claim 43, further configured to dynamically adapt the variable delay time by selecting a delay time based upon a worst-case delay, the worst-case delay being determined at least in part by determining a minimum delay necessary to avoid the local instrument missing reception of some data from the remote instrument.

46. A musical instrument, including:

a connection circuit configured to establish a connection between a local circuit operably connectable to a local instrument and a remote circuit operably connectable to a remote instrument;

a time stamper circuit configured to correlate first relative time stamps with remote instrument data and to correlate second relative time stamps with local instrument data for transmission to the remote instrument;

a timing manager circuit to receive data from the remote circuit and to play the data as notes locally on the musical instrument at times based at least in part upon the first relative time stamps;

delay circuitry configured to dynamically adapt a variable delay time for the timing manager circuit based upon network transmission delays between the remote circuit and the performance collaboration system, the delay circuitry configured to introduce the variable delay time to local playback of the received data.

*47. A system, comprising:*

*a first interface located at a first location, the first interface configured to: receive data corresponding to music generated at a remote location, the data being received with relative time stamps relating to the music generated at the remote location, play back the music received from the remote location with dynamically adjustable delays at the first location, the dynamically adjustable delays correlating to the relative time stamps of the data relating to the music generated at the remote location, send data corresponding to music generated at the first location to the remote location with time stamps relating to the music generated at the first location; and*

*a second interface having a first port configured to receive data from the first interface and to transmit data to the first interface, and a second port coupled to a musical device capable of generating music, the second device including:*

*a memory configured to store data received by the first interface; and*

*a data assembly and transmission unit configured to retrieve the stored data, to provide data to the musical device, and to transmit data generated by the musical device.*

*48. The system of claim 47 further comprising a delay management unit coupled to at least one of the first interface and to the second interface.*

*49. The system of claim 47, wherein the first interface is further configured to receive the data corresponding to music generated at the remote location via a network.*

*50. The system of claim 49, wherein the first interface is further configured to:*

*establish communications with a server, via the network; and*

*receive from the server a network address associated with a device at the remote location.*

*51. The system of claim 47, wherein the data assembly and transmission unit is further configured to provide a substantially continuous stream of Musical Instrument Digital Interface (MIDI) data to the musical device.*

*52. The system of claim 47, wherein the first interface is further configured to receive data via a first communication path, send data via a second communication path, and deactivate a third communication path associated with voice signals while data is being transmitted.*

*53. A method of representing, at a first location, music that has been generated at a remote location, the method comprising:*

*receiving at the first location, via a network, data representing music generated at the remote location, the data comprising time stamps relating to the music generated at the remote location;*

*producing, at the first location, audible sounds corresponding to the data with a variable delay time that is dynamically adaptable to compensate for network transmission delays, the variable delay time being based at least in part upon the time stamps of the received data representing times of generation of data relative to at least one preceding data item; and*

*generating data relating to music played at the first location, and time stamps relating to the music played at the*

*first location, for transmission to the remote location and playback at the remote location with a variable time delay based at least in part upon the time stamps relating to the music played at the first location.*

*54. The method of claim 53 further comprising:*

*caching at least a portion of the received data in a memory;*

*outputting from the memory the at least a portion of the received data in a substantially continuous manner with the variable time delay;*

*accepting the outputted data with a musical instrument; and*

*producing the audible sounds with the musical instrument.*

*55. The method of claim 53 wherein the data comprises Musical Instrument Digital Interface (MIDI) data.*

*56. The method of claim 53 wherein the dynamically adaptable variable delay time is selected to compensate for network transmission delays by the use of relative time stamps corresponding to output sounds.*

* * * * *

UNITED STATES PATENT AND TRADEMARK OFFICE

CERTIFICATE OF CORRECTION

PATENT NO. : RE42,565 E
APPLICATION NO. : 12/592273
DATED : July 26, 2011
INVENTOR(S) : Paepcke It is certified that error appears in the above-identified patent and that said Letters Patent is hereby corrected as shown below:

Title page, item (56), under "Other Publications", in Column 2, Line 5, delete "(obrtained" and insert -- (obtained --.

Column 14, line 8, in Claim 29, delete "select to variable" and insert -- select the variable --.

Signed and Sealed this
Tenth Day of January, 2012

David J. Kappos
*Director of the United States Patent and Trademark Office*